United States Patent

[11] 3,586,111

| | | |
|---|---|---|
| [72] | Inventor | Carl D. Jackson<br>Fortville, Ind. |
| [21] | Appl. No. | 797,085 |
| [22] | Filed | Feb. 6, 1969 |
| [45] | Patented | June 22, 1971 |
| [73] | Assignee | C.D. Jackson Manufacturing Company<br>Fortville, Ind. |

[54] LANDSCAPING APPARATUS INCLUDING A SOD NOTCHER BLADE
6 Claims, 8 Drawing Figs.

[52] U.S. Cl. .................................................. 172/146,
172/200, 172/149, 172/265, 172/537, 172/739, 172/204
[51] Int. Cl. .................................................. A01b 49/02
[50] Field of Search ............................................. 37/117.5,
118, 141, 142, DIG 3; 172/136, 195—200, 785,
784, 782, 797, 13, 739, 777, 778, 133, 140, 668, 146

[56] References Cited
UNITED STATES PATENTS

| 815,894 | 3/1906 | Agey | 172/140 |
|---|---|---|---|
| 869,481 | 10/1907 | Daniel | 172/195 |
| 1,370,847 | 3/1921 | Sheppard | 172/140 |
| 1,869,916 | 8/1932 | Schmid | 172/782 X |
| 2,865,117 | 12/1958 | Davis et al. | 172/197 |
| 2,965,053 | 12/1960 | Gruber | 172/136 |
| 3,209,841 | 10/1965 | Van Der Lely et al. | 172/140 X |
| 3,266,050 | 8/1966 | Reeder | 172/797 X |
| 3,274,713 | 9/1966 | Jones | 172/197 |
| 3,470,964 | 10/1969 | West et al. | 172/197 |

FOREIGN PATENTS

| 1,168,352 | 0/1964 | Germany | 172/784 |
|---|---|---|---|

Primary Examiner—Robert E. Pulfrey
Assistant Examiner—Clifford D. Crowder
Attorney—Woodard, Weikart, Emhardt and Naughton ABSTRACT: Landscaping apparatus including a bucket having a lower scraping edge at the rear of the bucket, plow blades at the front of the bucket, raking tines between the scraping edge and the plow blades, and a roller mounted to the rear of the bucket rear. A sod notcher blade is mounted inside the bucket for placing a notch or groove in the ground beside a walk. A spring-biased snap-action locking means is provided for selectively locking the raking tines into and out of operating position. A chain is selectively connected between the bucket and the roller for placing all of the weight of the bucket on the roller. The plow blades are spring biased into their forward position.

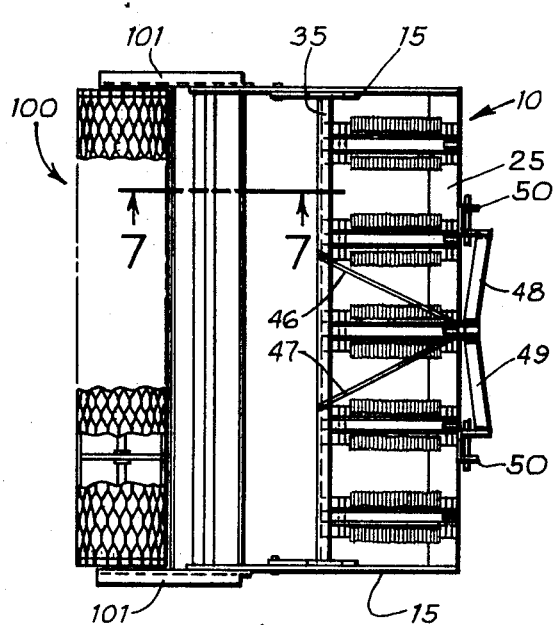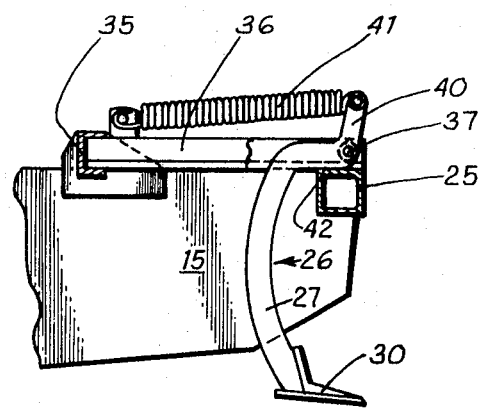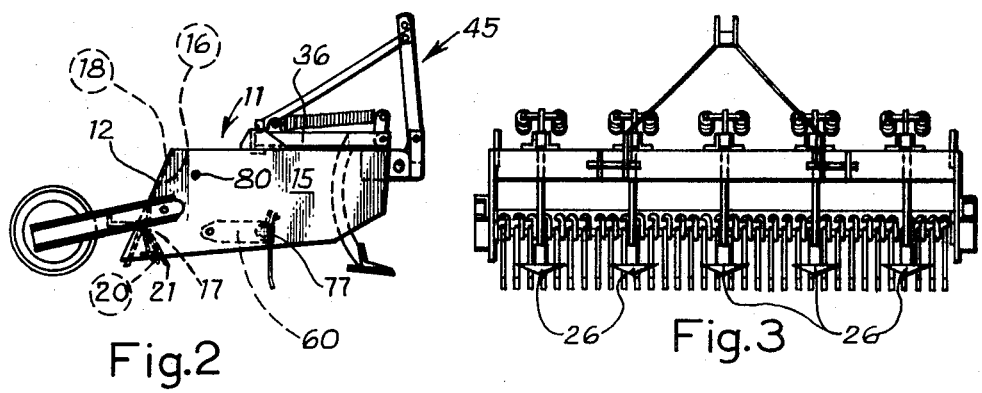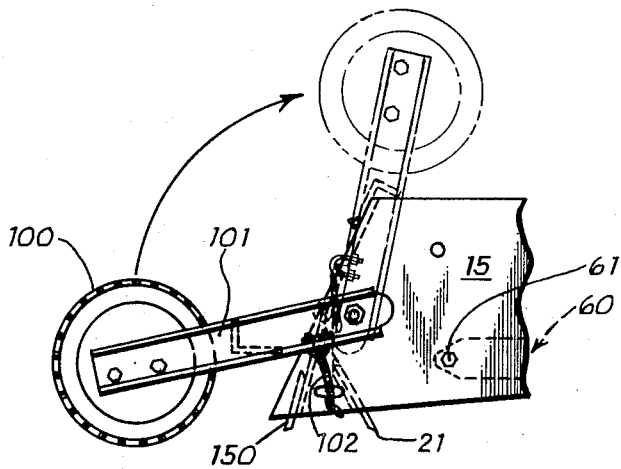

3,586,111

LANDSCAPING APPARATUS INCLUDING A SOD NOTCHER BLADE

BACKGROUND OF THE INVENTION

1. Field of the Invention

The field of the invention is generally landscaping apparatus particularly adapted for the leveling and preparation of ground around a residence prior to grass seeding thereof.

2. Description of the Prior Art

The present conventional procedure for preparing ground for grass seeding involves a number of operations many of which are accomplished by men on foot using handtools. Many of these manual operations are eliminated by the apparatus disclosed in my copending application Ser. No. 487,809 now U.S. Pat. No. 3,448,814. One problem which has not found solution until the present invention is the providing of a groove or notch in the soil alongside a cement walk, driveway or the like. Such a notch is desirable for drainage purposes and to improve grass cutting but until the present invention has been placed manually.

SUMMARY OF THE INVENTION

One embodiment of this invention might involve in landscaping apparatus including a bucket having an open bottom and top, said bucket having a rear having a forward recessed face and a straight lower scraping edge, said bucket having a pair of sides extending forwardly from said rear, and a crossmember fixed to said sides at the upper forward portion of said bucket, the improvement which comprises: a sod notcher swingably mounted on the inside of said bucket and on said rear, said sod notcher including a notching blade, and means for pinning said blade so as to project downwardly below the lower scraping edge of said rear.

One object of this invention is to provide an improved landscaping apparatus.

Another object of this invention is to provide landscaping apparatus capable of providing a groove or notch in the sod adjacent a walk or the like.

A further object of this invention is to provide landscaping apparatus which is rugged and highly resistant to damage.

Still another object of this invention is to provide landscaping apparatus incorporating a roller capable of exerting substantial force on the earth.

Still a further object of this invention is to provide landscaping apparatus incorporating an improved raking tine arrangement.

Related objects and advantages will be apparent as the description proceeds.

BRIEF DESCRIPTION OF THE DRAWINGS

FIG. 1 is a top plan view of landscaping apparatus embodying the present invention.

FIG. 2 is a side elevation of the structure illustrated in FIG. 1.

FIG. 3 is a front elevation of the structure illustrated in FIGS. 1 and 2.

FIG. 4 is an enlarged fragmentary section of the structure illustrated in FIGS. 1—3 and showing the details of a respective plow blade.

FIG. 5 is an enlarged side elevation of the structure of the FIGS. 1—4 showing the two operating positions of a roller forming a part of the structure.

DESCRIPTION OF THE PREFERRED EMBODIMENTS

Figure 6:
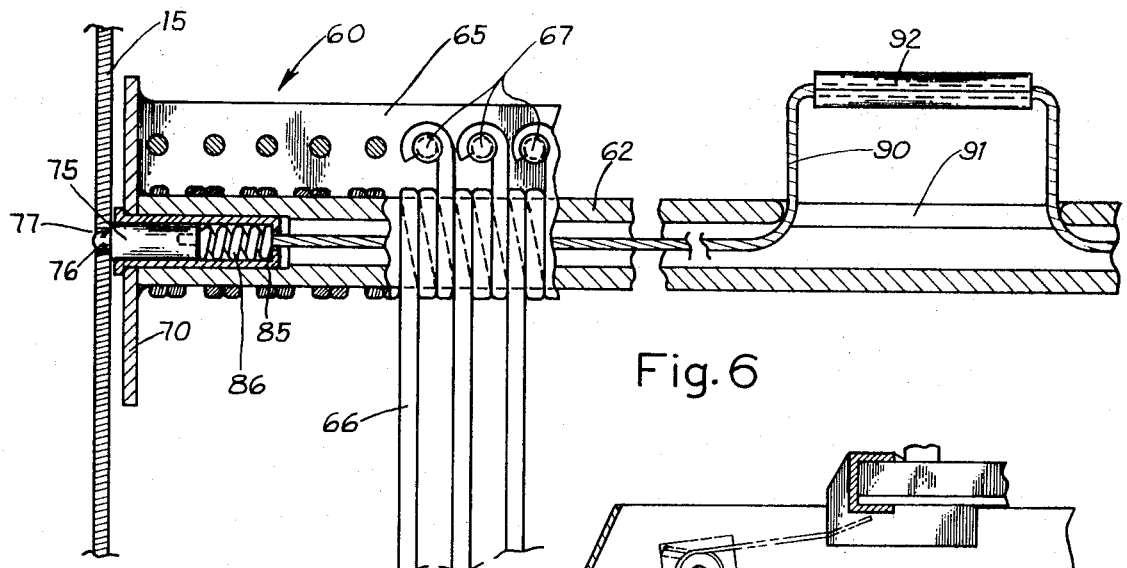
FIG. 6 is an enlarged vertical section taken along the line 6—6 of FIG. 7 in the direction of the arrows.

Referring now more particularly to the drawings, there is illustrated a landscaping apparatus 10 which includes a grader bucket 11 having a rear 12 and a pair of sides 15. The sides 15 are fixed to the rear 12 and project forwardly therefrom. The rear 12 has a recessed forward face 16, said recess being defined by a central vertical portion 17, an upper portion 18 and a lower blade portion 20 which extends downwardly and forwardly and has a straight lower scraping edge 21.

Fixed to the sides 15 at their upper forward portion is a crossbar 25 which may have a hollow rectangular cross section as shown in FIG. 4. The crossbar 25 has pivotally mounted thereon at equal intervals therealong a plurality of depending plow blades 26. Each of the plow blades includes a shank portion 27 and a blade per se 30 connected to the distal end of the shank portion. Each of the blades 26 curves downwardly and forwardly and extends beneath the lower surface of the sides 15.

A further crossmember 35 is fixed to the sides 15 and is spaced from the front crossmember 25. Bracing means 36 extend between the two crossmembers 25 and 35. As mentioned the plow blades 26 are swingably mounted upon the crossmember 25. The precise location of the swingable mounting is upon the bracing means 36 which are fixed to the crossmember 25. There are two bracing means 35 provided for each plow blade 26 with each of the two bracing means being positioned outside of the respective plow blade and providing a location for mounting of a pin 37 which extends between the two bracing means 36 for mounting of the plow blade. The plow blade shank 27 has an upwardly projecting integral portion 40 to which is connected a pair of tension springs 41 the other ends of which are fixedly secured to respective bracing members 36 adjacent the crossmember 35. It can be appreciated that each of the springs 41 provided for each of the plow blades 26 will function to normally maintain the plow blade in the downwardly and forwardly projecting position illustrated in FIG. 4. In the position of FIG. 4 each plow blade 26 has a shank portion surface 42 which engages the upper surface of the crossmember 25 and limits the forward movement of the plow blade. The plow blade is yieldably movable, however, backwardly and upwardly from the illustrated position of FIG. 4 by means of the yielding action of the tension springs 41. Of course, each pair of tension springs 41 is relatively strong and consequently the respective plow blade will not yield unless it engages a relatively large rock or the like in the soil. The arrangement including the springs 41 makes possible the continued operation of the present landscaping apparatus even though relatively large rocks are encountered and prevents damage to the present apparatus.

The grader bucket construction of the present invention is connected to a tractor or prime mover by means of a coupling assembly 45 which includes four members 46, 47, 48 and 49. The members 46 and 47 are fixed to the crossmember 35 while the members 48 and 49 are fixed to the forward crossmember 25 through yoke members 50.

Figure 7:
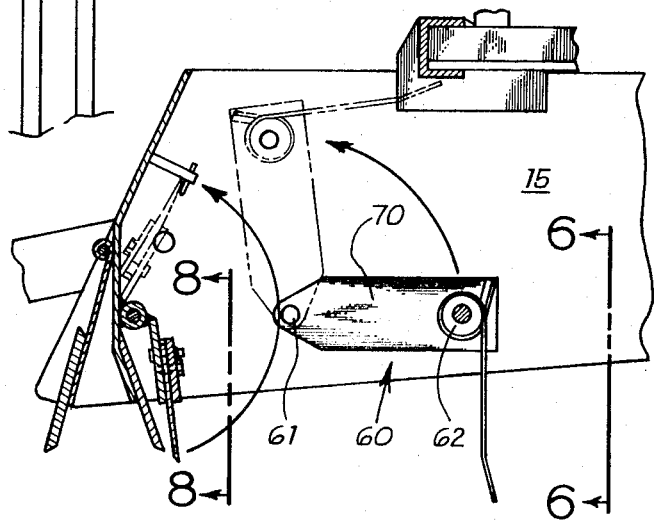
FIG. 7 is an enlarged vertical section taken along the line 7—7 of FIG. 1 in the direction of the arrows.

A raking tine mounting element 60 is swingably mounted upon the grader bucket for swinging about an axis 61. The tine mounting element 60 includes a tube 62 and a flat member 65 fixed to and extending away from the tube 62. The raking spring tines 66 are coiled about the tube 62 and are fixed to the flat member 65. The tube 62 is fixed at its opposite ends to mounting elements 70 which are swingably mounted to the sides 15. As shown in FIG. 7, the mounting element 60 is swingable between two positions in one of which (the lower position) the raking tines project downwardly below the bottom of the grader bucket for raking and in the other of which the raking tines are raised upwardly into the grader bucket out of operating position.

Referring to FIG. 6, it can be seen that the tube 62 can be locked in either of the positions shown in FIG. 7 by means of snap members 75 (only one of which is shown). Each of the snap members 75 includes a small tit 76 which projects outwardly away from the mounting element and is engageable with either of two sets of two apertures 77 and 80 (FIG. 2) which are located at the above-mentioned respective positions of the mounting element 60. Thus, when the snap members 75 are projected into the apertures 77 the raking tines are maintained in the position shown in FIG. 2. When the snap members 75 are projected into the apertures 80 the raking tines will be retained in the dotted line position in FIG. 7. The snap members 75 are slidably received within inserts 85 press fitted within the ends of the tube 62. A compression spring 86 is received within each of the inserts 85 and functions to normally maintain the snap members 75 projected to the outward position illustrated in FIG. 6. The snap members 75 may be retracted by pulling on a line 90 which is connected at its opposite ends to the snap members 75 and which extends from an opening 91 in the wall of the tube 62. Received on the line 90 is a handle 92 to facilitate pulling of the line 90. It can be seen that when the line 90 is pulled by the handle 92 the line will act to simultaneously retract both of the snap members 75 against the urging of springs 86 permitting movement of the mounting element 60 from one position or the other illustrated in FIG. 7.

Referring to FIGS. 1, 2 and 5, there is a roller 100 rotatably mounted upon the grader bucket by means of roller mounting members 101. The roller 100 is rotatable about its axis and is also movable between the two positions illustrated in FIG. 5, one of which is above and resting upon the top of the grader bucket and the other of which is to the rear of the grader bucket. Each of the mounting elements 101 is swingably mounted on a respective side 15 of the grader bucket. In order to cause a portion of the weight of the grader bucket to rest upon the roller 100, a chain 102 can be connected between the member 101 and the side 15 of the grader bucket. When the chain 102 is so connected, the roller is held at a downward position and the entire weight of the grader bucket assembly is supported on the roller.

Figure 8:
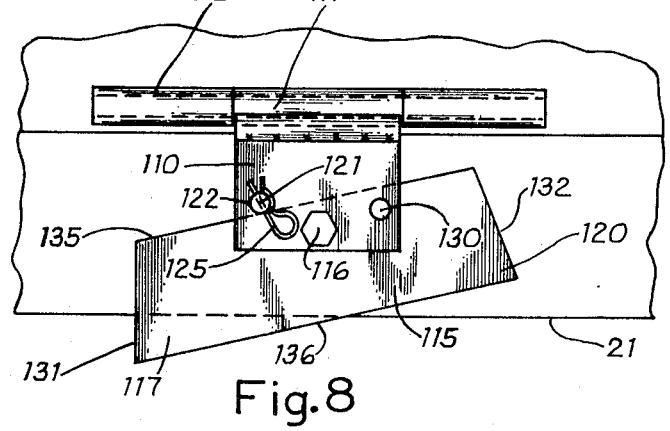
FIG. 8 is an enlarged vertical section taken along the line 8—8 of FIG. 7 in the direction of the arrows.

Referring to FIGS. 7 and 8, the sod notcher of the present invention is illustrated. A first flat plate 110 is swingably mounted upon a rod 111 rotatably received within a tube 112 fixed to the rear of the grader bucket. The sod notcher blade 115 is pivotally mounted on the plate 110 by means of a bolt 116. The blade 115 can be pinned with either the portion 117 of the blade projecting downwardly or with the portion 120 of the blade projecting downwardly. When it is desired to project the portion 117 of the blade 115 downwardly, the pin 121 is placed in the aperture 122 and is secured there by means of the resilient member 125. In similar fashion the portion 120 of the blade can be projected downwardly below the rearward edge 21 by placing the pin 121 through the aperture 130 and pinning it in position by means of the resilient member 125. The purpose of projecting either the portion 117 or the portion 120 below the edge 21 is to provide a blade for notching the earth adjacent to a walk or the like. Thus, if the walk is to the left of the blade 115 as viewed in FIG. 8, the portion 117 will fit next to the walk and just to the right thereof with the side 131 of the blade being immediately adjacent to the walk. On the other hand if the blade 115 is used to place a groove adjacent to the walk on the leftward side of the walk, the portion 120 will form the groove and the side 132 will be located immediately to the left of the walk. It will be noted that the sod notching blade 115 has a trapezoidal shape. That is the top 135 is parallel to the bottom 136 and the two sides 131 and 132 slope at equal angles to the bottom and the top and are so arranged that when the blade is pinned with either its portion 117 projected downwardly or its portion 120 projected downwardly the respective side 131 or 132 is vertical. Thus, in the position of FIG. 8, the side 131 is vertical.

It will be evident from the above description that the present invention provides an improved landscaping apparatus capable of providing a groove or notch in the earth adjacent to the walk or the like. It should be mentioned that in case the operator of the present apparatus decides to use the landscaping apparatus to move dirt in a rearward direction he can do so by means of the blade 150, which is fixed to the rear of the device. It should also be mentioned that this invention provides a landscaping apparatus which is rugged, and highly resistent to damage as well and provides a landscaping apparatus which incorporates a roller capable of exerting substantial force on the ground over which the roller is operating. The roller 100 may be provided with any sort of external grooved configuration which makes possible the automatic providing of seed grooves in the soil prepared.

I claim:

1. In landscaping apparatus including a bucket having an open bottom and top, said bucket having a rear having a forward recessed face and a straight lower scraping edge, said bucket having a pair of sides extending forwardly from said rear, and a crossmember fixed to said sides at the upper forward portion of said bucket, the improvement which comprises: a sod notcher swingably mounted on the inside of said bucket and on said rear, said sod notcher including a notching blade, means for pinning said blade so as to project downwardly below the lower scraping edge of said rear, a plate pivotally mounted on said rear for swinging about a horizontal axis extending transversely of said bucket, said notching blade being pivotally mounted centrally thereof on said plate for movement about an axis which is perpendicular to said plate, said blade having an equilateral trapezoid shape with a parallel top and bottom and two sides, said blade being positionable by said pinning means in either of two positions in one of which positions one of said sides is vertical and said bottom slopes upwardly therefrom and in the other of which positions the other of said sides is vertical and said bottom slopes upwardly therefrom.

2. The landscaping apparatus of claim 1 additionally comprising a plurality of plow blades each secured to said crossmember and depending therefrom, each of said plow blades being swingably mounted on said crossmember and swingable downwardly and forwardly to a downwardly projecting position, said plow blades curving downwardly and forwardly and being equally spaced along the forward portion of said bucket, a plurality of coiled tension springs each secured to a respective one of said plow blades and to said bucket and maintaining the respective plow blade downwardly and forwardly to said downwardly projecting position except when extraordinary force is exerted on the respective blade.

3. The landscaping apparatus of claim 1 additionally comprising a roller extending parallel to and mounted on said bucket rear, said roller having an external grooved configuration, a pair of roller mounting members rotatably mounting said roller at distal ends of said roller mounting members and swingably secured to said bucket at the proximal ends of said roller mounting members, said roller being swingable to a first downward position located rearwardly of said bucket rear and to a second upward position resting upon said bucket, and a chain connected between said bucket and one of said roller mounting members and holding said roller downwardly when in said first position so that a portion of the weight of said bucket may be supported on said roller.

4. In landscaping apparatus including a bucket having an open bottom and top, said bucket having a rear having a forward recessed face and a straight lower scraping edge, said bucket having a pair of sides extending forwardly from said rear, and a crossmember fixed to said sides at the upper forward portion of said bucket, the improvement which comprises: a sod notcher swingably mounted on the inside of said bucket and on said rear, said sod notcher including a notching blade, means for pinning said blade so as to project downwardly below the lower scraping edge of said rear, a roller extending parallel to and mounted on said bucket rear, a pair of roller mounting members rotatably mounting said roller at distal ends of said roller mounting members and swingably secured to said bucket at the proximal ends of said roller mounting members, said roller being swingable to a first downward position located rearwardly of said bucket rear and to a second upward position resting upon said bucket, and a chain connected between said bucket and one of said roller mounting members and holding said roller downwardly when in said first position so that a portion of the weight of said bucket may be supported on said roller, a plurality of raking tines, a mounting element, said plurality of tines being equally spaced along said mounting element and fixed thereto, said tines being more closely spaced than said plow blades, said mounting element being positioned rearwardly of said plow blades and swingably mounted at its opposite ends upon said sides for swinging movement between a first position wherein said tines project downwardly below the lower edges of said sides and a second position wherein said tines are raised above the lower edges of said sides, a pair of snap members slidably mounted on said mounting element, said sides each having an aperture adjacent said first position of said mounting element and also each having an aperture adjacent said second position of said mounting element, spring means biasing said snap members outwardly and into engagement with respective ones of said apertures for holding said element in either said first position or said second position, and a line connecting said snap members, a tube forming a part of said mounting element and having said snap members slidably received therein, said line extending through said tube, said tube having an opening therein, a handle on said line, said line extending out of said tube at said opening and having said handle attached to the portion of said line which extends out of said tube whereby said handle can be used to pull said line to detach said snap members from said sides for movement of said mounting element out of said first or second position.

5. The landscaping apparatus of claim 4 additionally comprising a plate pivotally mounted on said rear for swinging about a horizontal axis extending transversely of said bucket, said notching blade being pivotally mounted centrally thereof on said plate for movement about an axis which is perpendicular to said plate, said blade having an equilateral trapezoid shape with a parallel top and bottom and two sides, said blade being positionable by said pinning means in either of two positions in one of which positions one of said sides is vertical and said bottom slopes upwardly therefrom and in the other of which positions the other of said sides is vertical and said bottom slopes upwardly therefrom.

6. The landscaping apparatus of claim 5 additionally comprising a plurality of plow blades each secured to said crossmember and depending therefrom, each of said plow blades being swingably mounted on said crossmember and swingable downwardly and forwardly to a downwardly projecting position, said plow blades curving downwardly and forwardly and being equally spaced along the forward portion of said bucket, a plurality of coiled tension springs each secured to a respective one of said plow blades and to said bucket, and urging the respective plow blade downwardly and forwardly to said downwardly projecting position.